United States Patent [19]

Chang et al.

[11] 4,444,902

[45] Apr. 24, 1984

[54] ACTIVATION OF HIGH SILICA ZEOLITES

[75] Inventors: Clarence D. Chang, Princeton; Joseph N. Miale, Lawrenceville, both of N.J.

[73] Assignee: Mobil Oil Corporation, New York, N.Y.

[21] Appl. No.: 333,370

[22] Filed: Dec. 22, 1981

[51] Int. Cl.$^3$ .......................... B01J 29/38; B01J 29/06
[52] U.S. Cl. ..................................... 502/86; 423/328; 502/64; 502/71
[58] Field of Search ............... 423/326, 328, 335, 341; 252/442, 445 Z, 441; 502/64, 71, 86

[56] References Cited

U.S. PATENT DOCUMENTS

| | | | |
|---|---|---|---|
| 2,400,446 | 5/1946 | Veltman | 252/442 |
| 3,354,078 | 11/1967 | Miale et al. | 252/455 Z |
| 3,644,220 | 2/1972 | Kearby | 252/442 |
| 3,702,886 | 11/1972 | Argauer et al. | 423/328 |
| 3,709,979 | 1/1973 | Chu | 423/328 |
| 3,933,983 | 1/1976 | Elliott | 423/328 |
| 4,297,335 | 10/1981 | Lok et al. | 423/328 |

*Primary Examiner*—Edward J. Meros
*Assistant Examiner*—Steven Capella
*Attorney, Agent, or Firm*—Alexander J. McKillop; James F. Powers, Jr.; Dennis P. Santini

[57] ABSTRACT

A method for enhancing the activity of high silica zeolite, i.e. a zeolite having a silica-to-alumina ratio greater than 100, is disclosed which involves calcining the zeolite, treating same with aluminum fluoride, followed by treating the zeolite with an ammonium salt solution and then calcining the final product in order to obtain a zeolite having enhanced activity.

14 Claims, No Drawings

ACTIVATION OF HIGH SILICA ZEOLITES

BACKGROUND OF THE INVENTION

1. Field of the Invention

This invention relates to a method for enhancing the acid activity (e.g. cracking and isomerization activity) of certain high silica-containing crystalline materials which involves contacting them with aluminum fluoride, followed by treatment with an ammonium salt solution and calcination.

2. Description of Prior Art

High silica-containing zeolites are well known in the art and it is generally accepted that the ion exchange capacity of the crystalline aluminosilicate is directly dependent on its aluminum content. Thus, for example, the more aluminum there is in a crystalline structure, the more cations are required to balance the electronegativity thereof, and when such cations are of the acidic type such as hydrogen, they impart tremendous catalytic activity to the crystalline material. On the other hand, high silica-containing zeolites having little or substantially no aluminum, have many important properties and characteristics and a high degree of structural stability such that they have become candidates for use in various processes including catalytic processes. Materials of this type are known in the art and include high silica-containing aluminosilicates such as ZSM-5 (U.S. Pat. No. 3,702,886), ZSM-11 (U.S. Pat. No. 3,709,979) and ZSM-12 (U.S. Pat. No. 3,832,449) to mention a few.

The silica-to-alumina ratio of a given zeolite is often variable; for example, zeolite X can be synthesized with a silica-to-alumina ratio of from 2 to 3 and zeolite Y from 3 to about 6. In some zeolites, the upper limit of silica-to-alumina ratio is virtually unbounded. Zeolite ZSM-5 is one such material wherein the silica-to-alumina ratio is at least 5. U.S. Pat. No. 3,941,871 discloses a crystalline metal organo silicate essentially free of aluminum and exhibiting an x-ray diffraction pattern characteristic of ZSM-5 type aluminosilicate. U.S. Pat. Nos. 4,061,724; 4,073,865 and 4,104,294 describe microporous crystalline silicas or organo silicates wherein the aluminum content present is at impurity levels.

Because of the extremely low aluminum content of these high silica-containing zeolites, their ion exchange capacity is not as great as materials with a higher aluminum content. Therefore, when these materials are contacted with an acidic solution and thereafter are processed in a conventional manner, they are not as catalytically active as their higher aluminum-containing counterparts.

The novel process of this invention permits the preparation of certain high silica-containing materials which have all the desirable properties inherently possessed by such high silica materials and, yet, have an acid activity which heretofore has only been possible to be achieved by materials having a higher aluminum content in their "as synthesized" form.

It is noted that U.S. Pat. Nos. 3,354,078 and 3,644,220 relate to treating crystalline aluminosilicates with volatile metal halides. Neither of these latter patents is, in addition, concerned with treatment of crystalline materials having a high silica-to-alumina mole ratio of at least 100.

SUMMARY OF THE INVENTION

The present invention relates to a novel process for improving acid activity such as, for example, cracking activity and isomerization activity, of certain high silica-containing crystalline zeolites which comprises the steps of calcining the high silica-containing material, either "as synthesized" or initially ion-exchanged, contacting said calcined material with solid aluminum fluoride, such as that precipitated from solution containing a salt of aluminum, e.g. $Al(NO_3)_3$, and a fluoride compound, e.g. $NH_4F$, contacting said aluminum fluoride contacted material with an ammonium salt solution and calcining said ammonium salt solution contacted material. The resulting zeolite material exhibits enhanced Bronsted acidity, and, therefore, improved acid activity toward catalysis of numerous chemical reactions, such as, for example cracking and isomerization of organic, e.g. hydrocarbon, compounds.

DESCRIPTION OF SPECIFIC EMBODIMENTS

The novel process of this invention is concerned with the treatment of high silica-containing crystalline material. The expression "high silica-containing crystalline material" is intended to define a crystalline structure which has a silica-to-alumina ratio greater than 100 and more preferably greater than 500, up to and including those highly siliceous materials where the silica-to-alumina ratio is infinity or as reasonably close to infinity as practically possible. This latter group of highly siliceous materials is exemplified by U.S. Pat. Nos. 3,941,871; 4,061,724; 4,073,865 and 4,104,294 wherein the materials are prepared from reaction solutions which involve no deliberate addition of aluminum. However, trace quantities of aluminum are usually present due to the impurity of the reaction solutions. It is to be understood that the expression "high silica-containing crystalline material" also specifically includes those materials which have other metals besides silica and/or alumina associated therewith, such as boron, iron, chromium, etc. Thus, the only requirements with regard to the starting materials utilized in the novel process of this invention is that they have a silica-to-alumina ratio greater than about 100 (irrespective of what other materials or metals are present in the crystal structure).

The starting materials utilized herein having a silica-to-alumina mole ratio greater than about 100 may be prepared from reaction mixtures containing sources of various cations. The present process provides noted improvement regardless of which cation sources are present in said reaction mixtures. Non-limiting examples of cation sources to be used in the manufacture of the starting materials include amines, diamines, pyrrolidine, onium compounds and compounds containing multiple cationic centers. Examples of onium compounds are those having the following formula:

$$R_4M^+X^-$$

wherein R is alkyl of from 1 to 20 carbon atoms, heteroalkyl of from 1 to 20 carbon atoms, aryl, heteroaryl, cycloalkyl of from 3 to 6 carbon atoms, cycloheteroalkyl of from 3 to 6 carbon atoms, or combinations thereof; M is a quadricoordinate element (e.g. nitrogen, phosphorus, arsenic, antimony or bismuth) or a heteroatom (e.g. N, O, S, Se, P, As, etc.) in an alicyclic, heteroalicyclic or heteroaromatic structure; and X is an anion (e.g. fluoride, chloride, bromide, iodide, hydroxide, acetate, sulfate, carboxylate, etc.). When M is a heteroatom in an alicyclic, heteroalicyclic or heteroaromatic structure, such structure may be, as non-limiting examples,

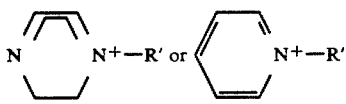

wherein R' is alkyl of from 1 to 20 carbon atoms, heteroalkyl of from 1 to 20 carbon atoms, aryl, heteroaryl, cycloalkyl of from 3 to 6 carbon atoms or cycloheteroalkyl of from 3 to 6 carbon atoms.

The compounds containing multiple cationic centers include those having the formula:

wherein R, M and X are as above defined, Z is a bridging member selected from the group consisting of alkyl of from 1 to 20 carbon atoms, alkenyl of from 2 to 20 carbon atoms, aryl, heteroalkyl of from 1 to 20 carbon atoms, heteroalkenyl of from 2 to 20 carbon atoms and heteroaryl, and n is a number of from 1 to about 50. Non-limiting examples of such multiple cationic center containing compounds include:

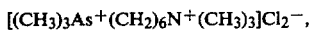

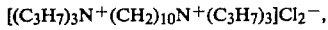

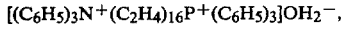

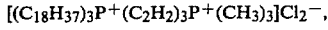

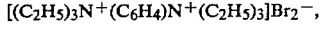

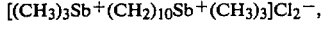

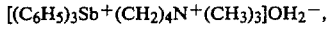

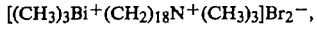

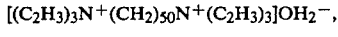

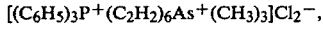

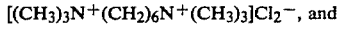, and

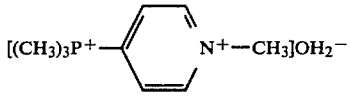

The novel process of this invention is simple and easy to carry out although the results therefrom are dramatic, especially with regard to enhanced isomerization activity. The novel process of this invention is carried out by calcining a high silica crystalline material having a silica-to-alumina ratio of at least 100, preferably at least 500, by heating the same at a temperature within the range of about 200° C. to 600° C. in an atmosphere of air, nitrogen, etc. at atmospheric, superatmospheric or subatmospheric pressures for between 1 minute and 48 hours. The calcined zeolite is thereafter contacted with aluminum fluoride at a temperature of from about 0° C. to about 650° C., preferably from about 20° C. to about 550° C. It is noted that the melting point of aluminum fluoride is 1040° C. The aluminum fluoride treated zeolite may, if desired, be hydrolyzed by contact with water at a temperature of from about 20° C. to about 550° C. When the hydrolyzing temperature is below 100° C. at atmospheric pressure, liquid water may be used. When the boiling point of water is exceeded, such as when the hydrolyzing temperature exceeds 100° C. at atmospheric pressure, the zeolite may be purged with water saturated gas, e.g. helium. The aluminum fluoride contacted and, if desired, hydrolyzed zeolite is contacted with an ammonium salt solution, aqueous or non-aqueous, and thereafter calcined at a temperature of from about 200° C. to about 600° C. in an inert atmosphere of air, nitrogen, etc. at subatmospheric, atmospheric or superatomspheric pressures for from about 1 minute to about 48 hours.

Optionally, the zeolite may be calcined prior to ammonium salt solution contacting at a temperature of from about 200° C. to about 600° C. in an inert atmosphere for from about 1 minute to about 48 hours. Also, the ammonium salt solution contacted zeolite may be steamed, if desired, prior to the final calcination step. Such optional steaming step may be conducted at a temperature of from about 450° C. to about 550° C., with 20 to 100% steam, for from about 15 minutes to about 24 hours. If the optional steaming step is used, the steamed zeolite may, if desired, be again contacted with an aqueous or non-aqueous ammonium salt solution prior to final calcination.

In short, the following list of activation steps will be followed by the present method:
1. calcination
2. AlF$_3$ contact
3. optional hydrolysis
4. optional calcination
5. NH$_4$+ contact
6. optional steaming
7. optional NH$_4$+ contact
8. calcination The amount of aluminum fluoride which is utilized in the aluminum fluoride contacting step is not narrowly critical but usually from about 0.1 to about 1 gram of aluminum fluoride is used per gram of high silica crystalline material. The aluminum fluoride may be provided as a precipitate in solution with the zeolite, such as when the zeolite is mixed with an aqueous solution of an aluminum salt, e.g. NaAlO$_2$ or Al(NO$_3$)$_3$, followed by addition to the mixture of a source of fluoride ions, e.g. NH$_4$F in excess. In this fashion, the aluminum of the salt is converted to AlF$_3$ in solution.

The ammonium salt solution contacting step may be conducted with an aqueous solution of an ammonium salt, e.g. NH$_4$NO$_3$, for a period of time of from about 1 hour to about 20 hours at a temperature of from ambient to about 100° C. The ammonium salt used is not narrowly critical and will normally be an inorganic salt such as ammonium nitrate, ammonium sulfate, ammonium chloride, etc. It may also be conducted in non-aqueous fashion under the same contact conditions such as when the ammonium salt is provided in a saturated alcohol solvent solution. The alcohol solvents useful for this include, as non-limiting examples, ethanol, propanol, butanol and mixtures thereof.

Hydrolysis and the ammonium salt solution contacting steps may be conducted simultaneously when the ammonium salt solution is aqueous. In any event, the benefits gained by the ammonium salt contacting step are realized subsequent to the aluminum fluoride contacting step and prior to final calcination.

Of the high silica zeolite materials advantageously treated in accordance herewith, zeolites ZSM-5 and ZSM-11 are particularly noted. ZSM-5 is described in U.S. Pat. Nos. 3,702,886 and Re 29,948, the entire contents of each being hereby incorporated by reference herein. ZSM-11 is described in U.S. Pat. No. 3,709,979, the teaching of which is incorporated herein by reference.

The activity enhanced high silica-containing crystalline materials prepared by the present process are useful as catalyst components for acid catalyzed organic compound conversion reactions. Such reactions include, as non-limiting examples, cracking of hydrocarbons, wherein the reaction conditions include a temperature of from about 350° C. to about 600° C., a pressure of from about 0 to about 30 psia, and a weight hourly space velocity of from about 0.1 to about 10; and conversion of methanol to gasoline, wherein the reaction conditions include a temperature of from about 400° C. to about 500° C., a pressure of from about 0 to about 1000 psig, and a weight hourly space velocity of from about 0.1 to about 20.

In practicing a particularly desired chemical conversion process, it may be useful to incorporate the above-described activity enhanced crystalline zeolite with a matrix comprising another material resistant to the temperature and other conditions employed in the process. Such matrix material is useful as a binder and imparts greater resistance to the catalyst for the severe temperature, pressure and reactant feed stream velocity conditions encountered in many cracking processes.

Useful matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as alumina, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The matrix may be in the form of a cogel. The relative proportions of activity enhanced zeolite component and inorganic oxide gel matrix, on an anhydrous basis, may vary widely with the zeolite content ranging from between about 1 to about 99 percent by weight and more usually in the range of about 5 to about 80 percent by weight of the dry composite.

The following examples will illustrate the novel process of the present invention.

EXAMPLE 1

A high silica-containing zeolite ZSM-5 having a silica-to-alumina mole ratio of about 26,000:1 (65 ppm framework alumina, 110 ppm bulk alumina and 0.23 percent sodium) was calcined for 30 minutes at 538° C.

EXAMPLE 2

A high silica-containing zeolite ZSM-5 having a silica-to-alumina mole ratio of about 30,000:1 was calcined for 30 minutes at 538° C.

EXAMPLE 3

A two gram sample of the calcined zeolite from Example 1 was impregnated with 163 milligram of NaAlO$_2$ (Baker's; 65% NaAlO$_2$, 15–20% NaOH; Assay 33.2% Na, 57.1% Al$_2$O$_3$ and 84.5% ash) dissolved in 1 milliliter water. The impregnated material was dried for 1 hour at 130° C. To the dried material was added 6 milliliters of aqueous solution containing 0.4 gram NH$_4$F which was a large enough excess to convert all aluminum from the NaAlO$_2$ to AlF$_3$. The total solution was placed in an ultrasonic bath for 1 minute, washed three times with 20 milliliters of water, and then dried at 130° C. The product was then calcined overnight at atmospheric pressure and 650° C. The calcined material was then exchanged with 1 N NH$_4$NO$_3$ solution, steamed at 450° C. for 22 hours (100% steam) and then again exchanged with 1 N NH$_4$NO$_3$ solution. The resulting product zeolite was again calcined as above.

EXAMPLE 4

A 1/16th inch extrudate was made comprising 35 weight percent alumina binder and 65 weight percent ZSM-5 zeolite made in Example 2. The extrudate was calcined in a muffle furnace at 538° C.

EXAMPLE 5

An aliquot of the calcined zeolite of Example 4 was refluxed in 1 N Al(NO$_3$)$_3$ for three hours, filtered and dried at 130° C. The aliquot portion was then impregnated with an excess of NH$_4$F solution and filtered. The excess NH$_4$F was sufficient to cause precipitation in the solution of AlF$_3$. The wet filter cake was then dried at 130° C. and treated with aqueous solution of NH$_4$NO$_3$ (1 N). The resulting product zeolite was calcined as above.

EXAMPLE 6

An sample of the zeolite made in Example 1 was treated with 1 N NH$_4$NO$_3$ and calcined at 538° C.

EXAMPLE 7

A 2 gram sample of the calcined zeolite of Example 6 was impregnated with a solution containing 2 grams Al(NO$_3$)$_3$.9H$_2$O, dried at 130° C. and then treated with an excess of NH$_4$F (sufficient for formation of AlF$_3$ precipitate). The product was hydrolyzed with hot water and then treated with a non-aqueous saturated NH$_4$NO$_3$/ethanol solution. After drying, the product was calcined for six hours at 650° C. and then again exchanged with 1 N NH$_4$NO$_3$ solution. The final product zeolite was calcined at 538° C.

EXAMPLE 8

The product zeolites of Examples 1, 3, 4, 5, 6 and 7 were evaluated for acid activity by the Alpha Test and/or CPI (cyclopropane isomerization) Test. The results of these tests are listed below:

| Zeolite Product of Example Number | Alpha Value (n-Hexane Cracking) | CPI Value (Cyclopropane Isomerization) |
| --- | --- | --- |
| 1 | 0.015 | 1[1] |
| 3 | 1.9 | 450[2] |
| 4 | 0.2 | — |
| 5 | 55 | — |
| 6 | 0.015 | 1 |
| 7 | 2.1 | 130 |

[1]Estimated value
[2]Extensive olefin oligomerization also observed.

It is observed from this that Alpha Values were enhanced by the present method from 0.015 to 1.9, from 0.2 to 55 and from 0.015 to 2.1, respectively. CPI values were enhanced from 1 to 450 and from 1 to 130, respectively. It is also noted that mere ion-exchange of the high silica material of Example 1 produced no activity enhancement (Example 6).

EXAMPLE 9

For comparison purposes, a 2 gram sample of the calcined zeolite of Example 6 was impregnated with 450 milligrams of anhydrous AlCl₃ dissolved in solvent alcohol (95% ethanol and 5% isopropyl alcohol) and calcined at 538° C. for 16 hours in air. One half of the resultant product was hydrolyzed in water and calcined at 538° C. The second half was treated with 1 N NH₄NO₃, washed, dried at 130° C. and then calcined at 538° C.

The two products of this example were evaluated as was done for the product zeolites of Examples 6 and 7. The results are listed below:

| Zeolite Product of Example Number | Alpha Value | CPI Value |
| --- | --- | --- |
| 6 | 0.015 | 1 |
| 7 | 2.1 | 130 |
| 9 First Half | 2.5 | 88 |
| 9 Second Half | 0.4 | — |

As is known in the art, the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec$^{-1}$). The Alpha Test is described in U.S. Pat. No. 3,354,078 and in The Journal of Catalysis, Vol. IV, pp. 522-529 (August 1965).

The CPI Index is a measure of the isomerization activity of a particular catalyst. The test involves measuring the rate of cyclopropane isomerization over the test catalyst and comparing it against silica-alumina (46 A.I.) as a reference standard. The test procedure involves utilizing a 5 to 250 mg. catalyst sample having a particle size of 20 to 200 mesh and mixing the same with about 1 ml of Vycor chips. The mixture is loaded into a 5 mm inside diameter Vycor reactor tube which is heated in air at a flow rate of 150 ml per minute to 538° C. and maintained there for 30 minutes. The sample is then cooled to 250° C. in helium at a flow rate of 12-80 ml per minute. Cyclopropane (helium/cyclopropane, 4, vol. to vol.) is then introduced and the reactor effluent analyzed by gas chromatographic techniques. The contact time is adjusted to keep the conversion within 0.5 to 50%. Since it is well known in the literature that the isomerization of cyclopropane is first order, rate constants may be determined at several temperatures to check for diffusional limitations. Using the above technique, the first order rate content for the standard 46 A.I. silica-alumina catalyst is 63.3 seconds$^{-1}$ at 250° C. This value was arbitrarily assigned an index of 1,000 so as to serve as a reference value. Thus, for example, the cyclopropane index (CPI Index) for a candidate catalyst with a first order rate constant of 0.633 would be determined as follows:

$$(1,000 \times 0.633)/63.3 = 10$$

What is claimed is:

1. A process for enhancing the acid activity of a crystalline zeolite having a silica-to-alumina mole ratio greater than about 100, which comprises calcining said crystalline zeolite at a temperature of from about 200° C. to about 600° C. for a period of time ranging from about 1 minute to about 48 hours, contacting said calcined zeolite with from about 0.1 to about 1 gram of solid aluminum fluoride per gram of crystalline zeolite at a temperature of from about 0° C. to about 650° C., treating said aluminum fluoride contacted zeolite with an ammonium salt solution and thereafter calcining said zeolite at a temperature of from about 200° C. to about 600° C. in order to obtain a crystalline zeolite having enhanced activity.

2. The process of claim 1 wherein said crystalline zeolite has a silica-to-alumina mole ratio greater than about 500.

3. The process of claim 2 wherein said ammonium salt solution is ammonium nitrate.

4. The process of claim 2 wherein said crystalline zeolite is ZSM-5.

5. The process of claim 2 wherein said crystalline zeolite is ZSM-11.

6. The process of claim 1 wherein said aluminum fluoride is provided as a precipitate in solution with said zeolite from the reaction of an aluminum salt and a source of fluoride ions.

7. The process of claim 6 wherein said crystalline zeolite has a silica-to-alumina mole ratio greater than about 500.

8. The process of claim 6 wherein said ammonium salt solution is ammonium nitrate.

9. The process of claim 6 wherein said crystalline zeolite is ZSM-5.

10. The process of claim 6 wherein said crystalline zeolite is ZSM-11.

11. The process of claim 1 which comprises an additional step of hydrolyzing said zeolite subsequent to said aluminum fluoride contacting step.

12. The process of claim 6 which comprises an additional step of hydrolyzing said zeolite subsequent to said aluminum fluoride contacting step.

13. The process of claim 1 which comprises an additional step of steaming said zeolite subsequent to said ammonium salt solution treating step.

14. The process of claim 6 which comprises an additional step of steaming said zeolite subsequent to said ammonium salt solution treating step.

* * * * *